United States Patent
Queiroz Hepner et al.

(10) Patent No.: US 12,371,949 B2
(45) Date of Patent: Jul. 29, 2025

(54) SUBSEA RISERS

(71) Applicant: Subsea 7 do Brasil Servicos Ltda, Niteroi (BR)

(72) Inventors: Gustavo Queiroz Hepner, Katy, TX (US); Luiz Carlos De Lemos Junior, Rio de Janeiro (BR); Daniel Karunakaran, Tananger (NO)

(73) Assignee: Subsea 7 do Brasil Servicos Ltda, Niteroi (BR)

( * ) Notice: Subject to any disclaimer, the term of this patent is extended or adjusted under 35 U.S.C. 154(b) by 0 days.

(21) Appl. No.: 17/913,969

(22) PCT Filed: Mar. 24, 2021

(86) PCT No.: PCT/BR2021/050123
§ 371 (c)(1),
(2) Date: Aug. 10, 2023

(87) PCT Pub. No.: WO2021/189122
PCT Pub. Date: Sep. 30, 2021

(65) Prior Publication Data
US 2023/0120150 A1    Apr. 20, 2023

(30) Foreign Application Priority Data
Mar. 24, 2020  (GB) ...................... 2004278

(51) Int. Cl.
*E21B 17/01*    (2006.01)
(52) U.S. Cl.
CPC .................. *E21B 17/012* (2013.01)
(58) Field of Classification Search
CPC .................................................. E21B 17/012
(Continued)

(56) References Cited

U.S. PATENT DOCUMENTS 3,313,358 A     4/1967  Postlewaite et al.
4,182,854 A *   1/1980  Hozumi .................. C08F 6/001
                                               528/500
(Continued)

FOREIGN PATENT DOCUMENTS

BR    PI0505400-1 A    9/2007
EP    2 042 682 A2     4/2009
(Continued)

OTHER PUBLICATIONS

Communication Pursuant to Article 94(3) EPC received in corresponding European Application No. 21 715 126.5 dated Sep. 20, 2023.

(Continued)

*Primary Examiner* — Tara Schimpf
*Assistant Examiner* — Patrick F Lambe
(74) *Attorney, Agent, or Firm* — Mattingly & Malur, PC (57) ABSTRACT

A subsea catenary riser comprises a rigid riser pipe that is suspended from a floating support on the surface and extends through a sagbend to the seabed. A hang-off interface allows rotation or pivoting of the riser pipe relative to the support about mutually orthogonal horizontal axes. A subsea buoy is positioned on the riser pipe above the sagbend. The buoy applies buoyant upthrust force to the riser pipe via an attachment interface that allows rotation or pivoting of the riser pipe relative to the buoy about mutually orthogonal horizontal axes. In response to movement of the support, the riser pipe deflects with S-shaped curvature to vary the inclination, relative to the buoy, of the portion of the riser pipe to which the buoy is attached. The curvature comprises mutually opposed curves respectively above and below the buoy, joined by a region of inflection that coincides with the buoy.

25 Claims, 5 Drawing Sheets (58) Field of Classification Search
USPC .......................................................... 166/350
See application file for complete search history.

(56) References Cited

U.S. PATENT DOCUMENTS

| | | | | |
|---|---|---|---|---|
| 5,269,629 | A * | 12/1993 | Langner | ................ E21B 19/004 |
| | | | | 405/195.1 |
| 8,550,171 | B2 | 10/2013 | Wajnikonis et al. | |
| 9,074,428 | B2 | 7/2015 | Lavagna | |
| 9,302,744 | B2 | 4/2016 | Pettersen | |
| 10,151,151 | B2 * | 12/2018 | Roper | ..................... E21B 17/01 |
| 10,633,935 | B2 | 4/2020 | Askestad | |
| 2006/0056918 | A1 * | 3/2006 | Luppi | ................... B63B 21/508 |
| | | | | 405/195.1 |
| 2009/0269141 | A1 * | 10/2009 | Li | .......................... B63B 27/24 |
| | | | | 405/172 |
| 2011/0091284 | A1 * | 4/2011 | Yemington | ............. B63B 22/18 |
| | | | | 114/121 |
| 2011/0226484 | A1 * | 9/2011 | Lavagna | ............... E21B 17/012 |
| | | | | 166/367 |
| 2011/0280668 | A1 | 11/2011 | Norwood | |
| 2016/0201407 | A1 * | 7/2016 | Haugom | ................. E21B 41/04 |
| | | | | 166/367 |

FOREIGN PATENT DOCUMENTS

| | | |
|---|---|---|
| GB | 1086881 | 10/1967 |
| GB | 2 462 638 A | 2/2010 |
| GB | 2473018 A | 3/2011 |
| WO | 97/06341 A1 | 2/1997 |
| WO | 00/63598 A1 | 10/2000 |
| WO | WO-0104454 A1 * | 1/2001 ........... E21B 17/012 |
| WO | 2010/025449 A1 | 3/2010 |
| WO | 2012/066031 A1 | 5/2012 |
| WO | 2016/028792 A1 | 2/2016 |
| WO | 2017/106449 A1 | 6/2017 |
| WO | 2017/131526 A1 | 8/2017 |

OTHER PUBLICATIONS

International Search Report received in corresponding International Application No. PCT/BR2021/050123.
Written Opinion received in corresponding International Application No. PCT/BR2021/050123.
API Specification 5L, "Specification for Line Pipe," 46th ed. 2018.
API Recommended Practice 1111, "Design, Construction, Operation, and Maintenance of Offshore Hydrocarbon Pipelines (Limit State Design)," 5th ed. 2015.
ANSI/API Specification 17J, "Specification for Unbonded Flexible Pipe," 4th ed. 2014.
API Recommended Practice 17B, "Recommended Practice for Flexible Pipe," 5th ed. 2014.
International Preliminary Report on Patentability received in corresponding International Application No. PCT/BR2021/050123 dated Jun. 28, 2022.
United Kingdom Search Report received in corresponding United Kingdom Application No. GB2004278.4 dated Oct. 7, 2020.
United Kingdom Combined Search Report and Examination Report received in corresponding United Kingdom Application No. GB2004278.4 dated Jun. 17, 2020.

* cited by examiner

SUBSEA RISERS

This invention relates to subsea risers as used in the offshore oil and gas industry to convey hydrocarbons and sometimes other fluids from the seabed to the surface. Risers may also be used reciprocally to convey other fluids, power and data from the surface to the seabed.

Various riser configurations are known, including those known in the art as free-hanging, steep, lazy-wave and weight-distributed risers. The riser is typically suspended between a floating upper support and the seabed, the support being a surface facility such as a platform or an FPSO (floating production, storage and offloading) vessel.

A riser moves in multiple directions on various timescales and frequencies throughout Its operational life. Motion of the riser is driven by multiple inputs, notably: motion of the floating upper support expressed as heave, pitch, roll and yaw; seawater motion caused by currents, tides and waves, including flows that promote vortex-induced vibration (VIV); and pipeline motion across the seabed, known in the art as walking. Repetitive or oscillatory motion generates fatigue in a riser that may, over time, cause its failure and rupture.

A common free-hanging riser comprises a rigid pipe that hangs freely as a catenary from a platform or from an FPSO vessel. Most conventionally, such a riser is of steel-hence being known in the art as a steel catenary riser or SCR.

Those skilled in the art know that nominally rigid pipes are not devoid of flexibility. Indeed, SCRs exploit the bending behaviour of rigid pipes in the elastic domain. However, whilst they have flexibility, 'rigid' pipes do not fall within the definition of 'flexible' pipes as understood in the art.

Conventional rigid pipes used in the subsea oil and gas industry are specified in the American Petroleum Institute (API) Specification 5L and Recommended Practice 1111. A rigid pipe usually consists of, or comprises, at least one pipe of solid steel or steel alloy. However, additional layers of other materials can be added, such as an internal liner layer or an outer coating layer. A rigid pipe may also have a concentric pipe-in-pipe (PiP) structure. Rigid pipe joints are terminated by a bevel, a thread or a flange, and are assembled end-to-end by welding, screwing or bolting them together to form a pipe string or pipeline.

Conversely, flexible pipes used in the subsea oil and gas industry are specified in API Specification 17J and Recommended Practice 17B. The pipe body is composed of a composite structure of layered materials, in which each layer has its own function. In particular, bonded flexible pipes comprise bonded-together layers of steel, fabric and elastomer and are manufactured in short lengths in the order of tens of metres. Typically, polymer tubes and wraps ensure fluid-tightness and thermal insulation, whereas steel layers or elements provide mechanical strength.

In recent years, the subsea oil and gas industry has begun to adopt rigid pipes of polymer composite materials in place of steel. Composite pipes have a tubular load-bearing structure that is principally of composite materials. This is to be distinguished from pipes having a composite structure, such as the various layered configurations of rigid and flexible pipes as mentioned above.

Typically, a composite pipe comprises a polymer resin matrix reinforced by fibres such as glass fibres or carbon fibres. The polymer matrix may be of thermoplastic or thermoset materials. The former results in what is known in the art as thermoplastic composite pipe or, more simply, as thermo-composite pipe (TCP). TCP is classed as a bonded composite pipe.

A simple free-hanging rigid riser such as an SCR has advantages of low cost, a short catenary length and ease of installation. For example, such risers may be installed by conventional pipelaying vessels using well-proven installation techniques such as S-lay, J-lay or reel-lay. However, a free-hanging rigid riser is particularly susceptible to fatigue-inducing motion being transmitted directly from a floating upper support toward the touch-down point or TDP, where the riser extends beyond a sagbend to meet the seabed. Also, the tension load at the top of a simple catenary riser increases with depth due to the weight of the riser that is suspended in the water column between the surface and the seabed.

An SCR is joined at its upper end to a surface facility such as an FPSO by a connection device that provides some degrees of freedom, examples being a stress joint or a flexible joint or pivot as described in WO 2010/025449. A drawback of flexible joints is their cost and difficulty of maintenance: the hang-off structure is located on the side hull of an FPSO or on a member of a floating platform.

A flexible joint often comprises an elastomeric element, as disclosed in U.S. Pat. No. 5,269,629 or WO 2016/028792. Conversely, WO 00/63598 discloses a gimballing SCR hang-off whereas in BR PI0505400, the riser is equipped with a half-sphere that can rotate within a complementary seat of a hang-off structure. However, such rotating devices cannot sufficiently accommodate SCR motion and fatigue when the surface facility is floating, for example when it is an FPSO.

In dynamic environments that suffer from high sea states and strong currents, FPSOs impart a large vertical motion at the riser balcony position. That motion is transmitted along the riser to the TDP and so can compromise riser integrity. Thus, a conventional SCR may not be appropriate for use in such environments. This creates a problem because more complex riser systems that meet all technical challenges are much more expensive, especially if they cannot be installed using techniques for which appropriate installation vessels are widely available. Thus, for some projects, available riser solutions are not viable or lead to a substantial increase in the field development cost.

It is known to decouple at least a portion of a riser from the motion of a supporting vessel. For example, degrees of freedom may be allowed at the connection between the riser and the vessel. This approach is used in hybrid risers such as that described in GB 2473018, which effect a flexible connection to the vessel through a flexible pipeline or jumper pipe. However, hybrid risers require extra buoyancy to support the weight of the riser because that weight load is not supported by the surface facility. Buoyancy tanks are commonly used and are difficult to handle and to install because of their weight and size. The flexible pipe is also a critical part and is more expensive than a corresponding steel pipe.

An SCR can be a component of a hybrid riser, as disclosed in U.S. Pat. No. 9,074,428 in which an anchored sub-surface buoy supports an SCR and is connected to an FPSO by a flexible line.

Another known solution to the problem of fatigue is to use a fully flexible riser made of unbonded flexible pipe, which can be manufactured in lengths of hundreds of metres.

However, unbonded flexible pipe is very expensive, has limited resistance to pressure and temperature and is of limited diameter and hence flow capacity.

In another approach to reducing fatigue, a riser may itself be shaped to introduce compliance. For example, WO 97/06341 discloses a lazy-wave steel catenary riser, which is characterised by a buoyantly supported hogbend between the surface and the TDP. The intermediate buoyancy around the hogbend also helps to support the suspended weight of the riser and so reduces its top tension.

The hogbend of a lazy-wave riser is defined and supported by adding external buoyancy modules to the riser. Multiple buoyancy modules are expensive; also, attaching them to the riser can be challenging and each attachment operation interrupts and hence delays the pipelaying process. Delay ties up valuable capital assets in the form of pipelaying vessels that are extremely expensive to operate. Delay also requires a longer weather window in which to complete the riser installation. The buoyancy modules must also be dimensioned and positioned with care to avoid sharp variations of curvature or regions where the effective tension is too low, or where there is a risk of inducing damaging dynamic compression.

EP 2042682 and WO 2017/131526 both describe risers that are suspended from a floating platform by means of a pivoting arrangement that includes a ball joint.

US 2011/0280668 relates to a hang-off adapter for use in an offshore riser system. The hang-off adapter is seated in a tension ring and allows for relative rotation between the riser and the tension ring.

US 2006/0056918 describes a riser system for connecting a subsea installation to a floating surface unit. A flexible pipe arranged in a catenary extends between the surface unit and a submerged buoy. A riser arranged in a catenary extends between the submerged buoy and the subsea installation.

GB 1086881 describes a riser that includes a flexible member near its upper end and a ball joint at its lower end.

Against this background, the invention resides in a subsea riser comprising a rigid riser pipe that is suspended from a surface support as a catenary extending from the surface support through a sagbend to a seabed touch-down point. The riser pipe is attached to the surface support by a hang-off interface that allows rotation of the riser pipe relative to the surface support about at least two horizontal axes. At least one subsea buoy is positioned on the riser pipe above the sagbend, the buoy being attached to the riser pipe by an attachment interface that allows rotation of the riser pipe relative to the buoy about at least two horizontal axes. The attachment interface may also allow rotation of the riser pipe relative to the buoy about a central longitudinal axis of the riser pipe.

The buoy is preferably attached only to the riser pipe and may be slidable along the riser pipe, in which case sliding movement of the buoy relative to the riser pipe may be limited by stopper formations that are spaced longitudinally along the riser pipe.

The buoy suitably comprises a buoyant body that is spaced radially from the riser pipe. For example, the buoyant body may be distributed angularly around the riser pipe and may extend continuously around the riser pipe, such as with a toroidal shape.

The attachment interface may comprise a part-spherical inner ball formation that is fixed relative to the riser, the ball formation being engaged with a complementary socket formation that is fixed relative to the buoyant body.

The riser may further comprise a pliant spool pipe extending between the hang-off interface and an upper connection structure of the surface support, the spool pipe being in fluid communication with an upper end of the riser pipe via the hang-off interface. A lower end portion of the spool pipe may be substantially aligned on a common longitudinal axis with an upper end portion of the riser pipe.

The inventive concept also embraces a buoy for a subsea riser, the buoy comprising an inner part for attachment to a riser pipe and an outer part that is movable relative to the inner part, wherein the inner part defines a longitudinal axis and the outer part is pivotable about pivot axes that are orthogonal to each other and that intersect the longitudinal axis. For example, the inner part may comprise a part-spherical inner ball formation and the outer part may comprise a complementary socket formation engaged with the ball formation. The outer part may also be pivotable about the longitudinal axis.

A buoyant body of the buoy may be spaced radially from the inner part, may be distributed angularly around the inner part, and may extend continuously around the inner part, for example as a toroid.

The inventive concept extends to a corresponding method of supporting a rigid subsea riser pipe that is suspended as a catenary from a surface support. The method comprises: applying buoyant upthrust force to the riser pipe from a subsea buoy that surrounds the riser pipe; and in response to movement of the surface support, deflecting the riser pipe to vary inclination, relative to the buoy, of a portion of the riser pipe extending through the buoy. The buoyant upthrust force is applied to the riser pipe via an attachment interface that allows rotation of the riser pipe relative to the buoy about at least two horizontal axes.

The deflection of the riser pipe may impart or vary S-shaped curvature in the riser pipe along its length, that curvature comprising mutually opposed curves respectively above and below the buoy, joined by a region of inflection that may coincide with the buoy.

An upper end of the riser pipe may be constrained while being allowed to pivot relative to the surface support in response to the deflection of the riser pipe. A pliant spool pipe extending upwardly from the upper end of the riser pipe may also be deflected in response to the deflection of the riser pipe. There could be limited longitudinal movement of the riser pipe relative to the buoy.

Thus, the invention provides an alternative solution to decouple the motion of a rigid riser. To do so, the invention adds an additional restraining element in the form of a special, preferably toroidal buoy that allows degrees of freedom relative to the riser extending within. In conjunction with rotation or pivoting allowed by a spherical hang-off system, motion of an FPSO and a riser can be accommodated by the riser bending freely along its length. Such bending takes place continuously and smoothly between the hang-off and the buoy and through the buoy toward the sagbend and the TDP.

Whilst WO 2012/066031 teaches a toroidal buoy for a transfer riser system, its disclosure only contemplates translation motion of the transfer riser through the central aperture of the torus.

The invention provides a riser solution with improved dynamic behaviour and reduced cost. The solution involves a combination of a hang-off joint and a buoy around a free-hanging riser. The riser is suspended from the hang-off joint at a floating support such as an FPSO and the buoy is attached to the riser in the water column above the sagbend, typically closer to the seabed than to the surface. The riser is movable relative to both the buoy and the hang-off joint. This arrangement creates two trigger points in the riser catenary, one at the top of riser and the other close to the sagbend.

Relative movement between the buoy and the riser, and between the riser and the hang-off joint, is possible about at least two mutually-orthogonal horizontal axes at each location. For example, a toroidal shell buoy may be attached to the riser via a ball joint, fixed to the riser, that allows the buoy to rotate around a centre of spherical curvature. This arrangement allows articulation with minimum stiffness due to very low friction force while the buoy supports some of the weight of the catenary and so reduces top tension. The buoy, and its buoyancy force, also increase inertia and drag forces and so damp oscillatory wave loads that are transmitted along the riser.

A riser in accordance with invention decouples loads that are transmitted along the riser from an FPSO, hence reducing the loads that are experienced at the TDP and addressing the problem of riser fatigue. The riser of the invention is less expensive than a lazy wave configuration that requires the installation of multiple buoyancy modules. Indeed, travelling down the riser from the upper end to the TDP, at no stage does the riser revert to an upward curve; this is unlike wave-configuration risers that have an upwardly convex hogbend disposed between the upper end and the TOP. The riser of the invention can be installed by any conventional installation technique such as J-Lay, S-Lay, or reel-lay.

The riser of the invention also provides an alternative solution to flexible joints conventionally used at the top of rigid risers, reducing the costs that relate to purchase and installation of the flexible joint.

Thus, a significant technical advantage of the invention is the improvement of loads around the riser sagbend section, close to the TDP. Other advantages include a reduction in top tension. In economic terms, it is possible to reduce capital expenditure and other costs, such as by removing the need to acquire and to attach buoyancy modules. As it enables installation by a regular multi-section pipelay procedure, the invention also reduces the operation time of installation vessels when compared with steep- and lazy-riser configurations.

Embodiments of the invention provide a buoy for supporting a rigid riser. The buoy comprises an interface with the riser such as a ball joint, the interface allowing free rotation of the riser around at least two axes. The buoy may have a toroidal shape. The buoy may not be anchored to the seabed, hence only being attached to the riser pipe.

The riser may be a catenary riser, which may be made of steel or of thermoplastic composite material. The riser could be able to rotate freely around any axis.

In some embodiments, the interface may allow the buoy to slide between two longitudinally spaced stoppers of the riser.

Embodiments of the invention also provide a riser, of the catenary type, for transporting fluids between the seabed level and a surface facility, the riser comprising: a riser pipe, which may be a rigid metal pipe or thermoplastic composite pipe; a hang-off interface on the surface facility to suspend the riser pipe; and an intermediate buoy between the surface and the main curvature or sagbend of the catenary.

The hang-off interface suitably comprises a housing and a seat and may allow at least rotation of the riser around two axes that may be in a substantially horizontal plane. The riser pipe may, for example, comprise a half-ball joint that is engaged rotatably into a complementary seat of the hang-off interface.

The riser may also comprise an upper pipe above the hang-off to connect the riser pipe to piping of the surface facility. The upper pipe may be bendable along its length, for example being a thermoplastic composite pipe or a flexible pipe.

The buoy is suitably located above the sagbend of the catenary riser, preferably between one third and two thirds of the depth of the water at that location and preferably at least 100 m above the seabed.

In summary, a subsea catenary riser of the invention comprises a rigid riser pipe that is suspended from a floating support on the surface and that extends through a sagbend to a TDP on the seabed. A hang-off interface allows rotation or pivoting of the riser pipe relative to the support about mutually orthogonal horizontal axes.

In accordance with embodiments of the invention to be described, a subsea buoy is positioned on the riser pipe above the sagbend. The buoy applies buoyant upthrust force to the riser pipe via an attachment interface that allows rotation or pivoting of the riser pipe relative to the buoy about mutually orthogonal horizontal axes. In response to movement of the support, the riser pipe deflects with S-shaped curvature to vary the inclination, relative to the buoy, of the portion of the riser pipe to which the buoy is attached. The curvature comprises mutually opposed curves respectively above and below the buoy, joined by a region of inflection that coincides with the buoy.

In order that the invention may be more readily understood, reference will now be made, by way of example, to the accompanying drawings, in which.

Figure 1:
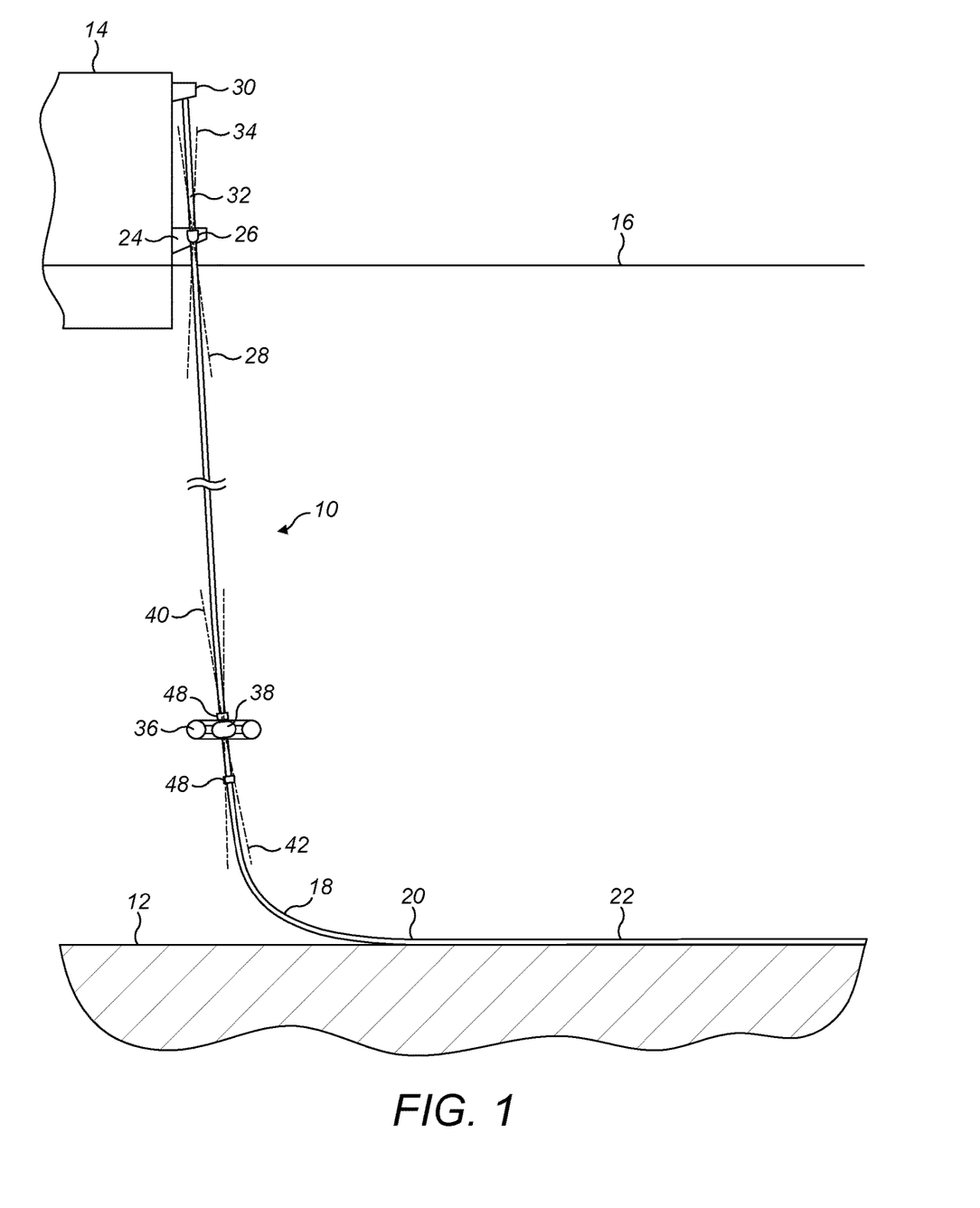
FIG. 1 is a schematic side view of a free-hanging catenary riser adapted in accordance with the invention, extending between the seabed and an FPSO floating at the surface.
Figure 2:
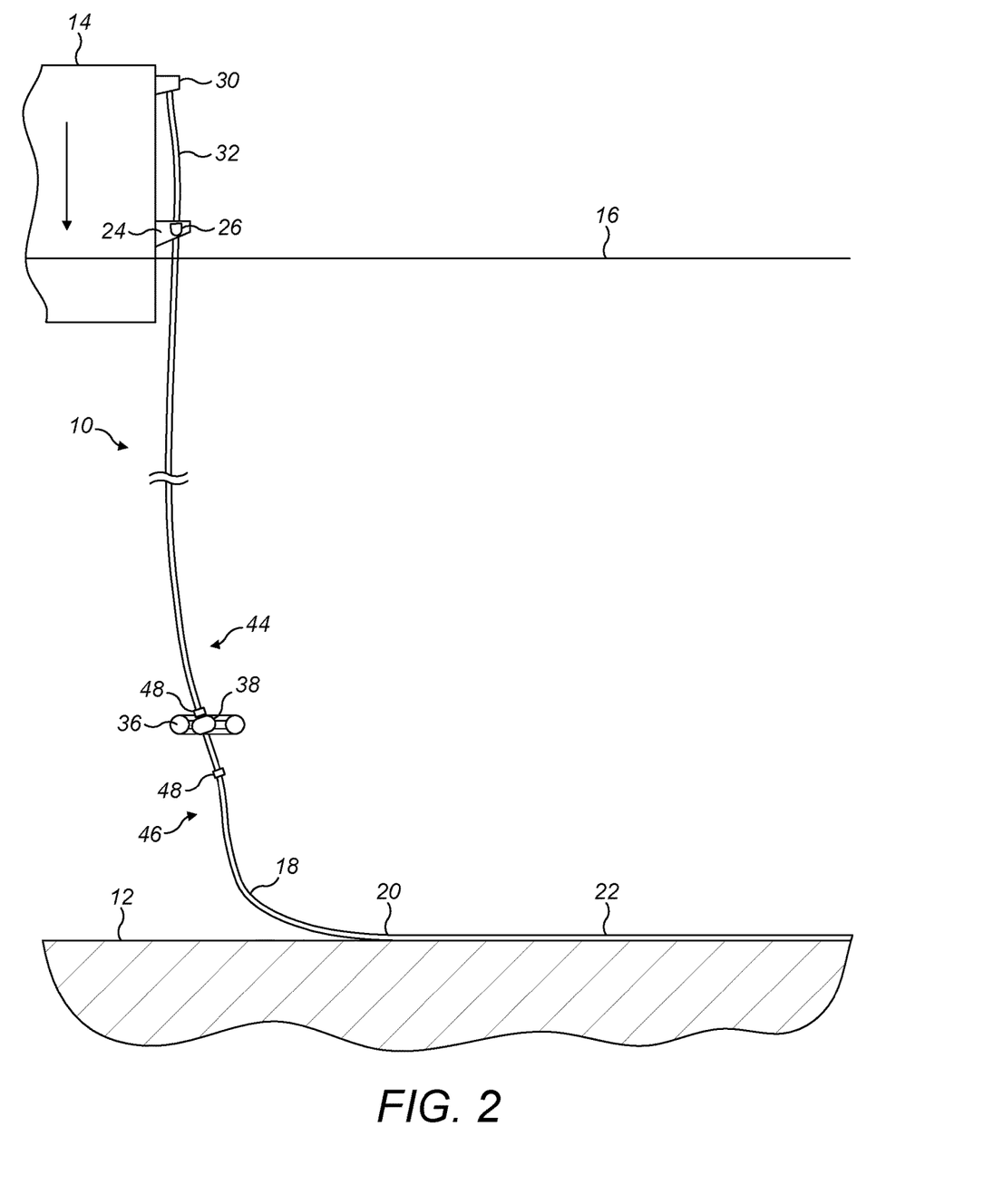
FIG. 2 corresponds to FIG. 1 but shows the riser bending along its length in response to heave motion of the FPSO.

In FIGS. 1 and 2, a riser 10 extending upwardly from the seabed 12 is suspended as a catenary from an upper support that is exemplified here by an FPSO 14 floating at the surface 16. The riser 10 is of rigid pipe, for example of steel or of TCP. As explained above, a rigid pipe as understood in the art is capable of being bent elastically along its length in use.

At its lower end, the riser 10 extends around a sagbend 18 to meet the seabed 12 at a touch-down point (TDP) 20. Beyond the TDP 20, the riser is in fluid communication with a static flowline 22 that lies on the seabed 12. The flowline 22 connects the riser 10 to a subsea source of hydrocarbons, such as a subsea well (not shown).

In these schematic views, which are not to scale, the typical depth of water between the surface 16 and the seabed 12 is greatly understated.

The riser 10 has negative buoyancy in seawater and so is held in tension by its suspended apparent weight. That weight, expressed in the art as top tension, is supported by a hang-off structure 24 protruding from the side of the hull of the FPSO 14.

The riser 10 is connected to the hang-off structure 24 by an articulating joint 26, exemplified here by a part-spherical ball-type joint. The joint 26 allows the riser 10 to pivot freely relative to the hang-off structure 24 about mutually orthogonal, substantially horizontal axes. Thus, as the riser 10 bends along its length, the top of the riser 10 can pivot relative to the hang-off structure 24 within a downwardly diverging cone 28 whose apex coincides with the centre of spherical curvature of the joint 26. In this example, the riser 10 is also able to twist or turn about its longitudinal axis relative to the hang-off structure 24.

An upper balcony or clamp 30 also protrudes from the side of the hull of the FPSO 14, above and spaced vertically from the hang-off structure 24. Typically, the vertical spacing between the hang-off structure 24 and the upper clamp 30 is up to about 12 m.

A pliant spool pipe 32 in fluid communication with the upper end of the riser 10 is supported by, and extends between, the hang-off structure 24 and the upper clamp 30. At the upper clamp 30, the pliant spool pipe 32 connects the riser 10 to pipework (not shown) aboard the FPSO 14, for example to convey hydrocarbon production fluids from the riser 10 for processing and storage. Thus, the upper clamp 30 serves as an upper connection structure for the pliant spool pipe 32 that connects the riser 10 to the FPSO 14.

The pliant spool pipe 32 may, for example, be made of thermo-composite pipe (TCP). By virtue of its pliancy, the spool pipe 32 can deflect within an upwardly diverging cone 34 that is in mirror-image alignment and mutual opposition to the downwardly diverging cone 28 about the joint 26 of the hang-off structure 24. Thus, the pliancy of the spool pipe 32 provides enough flexibility to support bending of the riser 10 involving rotation of the joint 26.

The riser 10 is adapted in accordance with the invention by the attachment of a buoyancy module or buoy 36 to the riser 10. The features of the buoy 36 and its interaction with the riser 10 are also evident in FIGS. 3 to 5.

The buoy 36 is attached to the riser 10 above the seabed 12, typically at least 100 m above the seabed 12 to place the buoy 36 above the sagbend 18 of the riser 10. More generally, the buoy 36 is disposed in the water column between the seabed 12 and the surface 16 at a depth corresponding to, for example, between one third and two thirds of the height of the water column and hence of the overall depth of the water. Preferably the buoy 36 is at a depth that is closer to the seabed 12 than to the surface 16.

The buoy 36 is connected to the riser 10 by an articulating joint 38, again exemplified here by a part-spherical ball-type joint whose structure will be explained in more detail with reference to FIGS. 3 to 5. The joint 38 allows the riser 10 to pivot freely relative to the buoy 36 about mutually orthogonal, substantially horizontal axes. In this example, the riser 10 is also able to twist or turn about its longitudinal axis within and relative to the buoy 36.

Thus, as the riser 10 bends along its length, the riser 10 can pivot relative to the buoy 36 within an upwardly diverging cone 40 and a downwardly diverging cone 42 in mirror-image alignment and mutual opposition about the joint 38. The cones 40, 42 converge so that their respective apices meet at the centre of spherical curvature of the joint 38.

By virtue of the joint 38, minimal friction between the riser 10 and the buoy 36 allows the riser 10 to deflect readily and rapidly relative to the buoy 36 without requiring the buoy 36 itself to deflect or tilt. Thus, the inertia and hydrodynamic drag of the buoy 36 does not hinder free deflection of the riser 10 in response to, for example, dynamic motion of the FPSO 14. Nevertheless, beneficially, the inertia and drag of the buoy 36 help to damp oscillatory motion of the riser 10.

FIG. 1 shows that when at rest, the riser 10 hangs in a smooth catenary curve that extends through the buoy 36 without inflection. Conversely, it will be apparent from FIG. 2 that the joint 38 allows the riser 10 to deflect rapidly relative to the buoy 36, changing its longitudinal curvature in response to motion of the FPSO 14. For example, the riser 10 may adopt the shallow S-shaped curvature of FIG. 2 in response to downward heave motion of the FPSO 14.

The S-curve of the riser 10 extends through the buoy 36, hence comprising opposed upper and lower curves 44, 46 respectively above and below the buoy 36. At a point of inflection coincident with or close to the buoy 36, the curvature of the upper curve 44 reverses into the opposite curvature of the lower curve 46. The curvature of the lower curve 46 reverses again toward the sagbend 18.

The downward extent of the S-curve ends above the sagbend 18 of the riser 10. By its deflection, alternately bending and straightening, the S-curve therefore substantially isolates the TDP 20 from forces in the riser 10 driven by motion of the FPSO 14. For example, isolating the TDP 20 from compressive forces in the riser 10 driven by heave of the FPSO 14 beneficially reduces the effects of fatigue and the possibility of the riser 10 buckling.

Deflection of the top of the riser 10 is accommodated by the joint 26 of the hang-off structure 24 and also by opposite deflection of the pliant spool pipe 32 that extends from the joint 26 to the upper clamp 30, as will be apparent in FIG. 2.

In the example shown in FIGS. 1 and 2, the buoy 36 can also slide along and relative to the riser 10 within a longitudinal range of movement that is delimited by radially protruding stopper formations 48 spaced apart longitudinally along the riser 10. This allows the riser 10 to move rapidly, within that limited range, through and relative to the buoy 36 in response to sudden vertical movements of the FPSO 14, while corresponding movement of the buoy 36 can lag slightly due to inertia.

Figure 3:
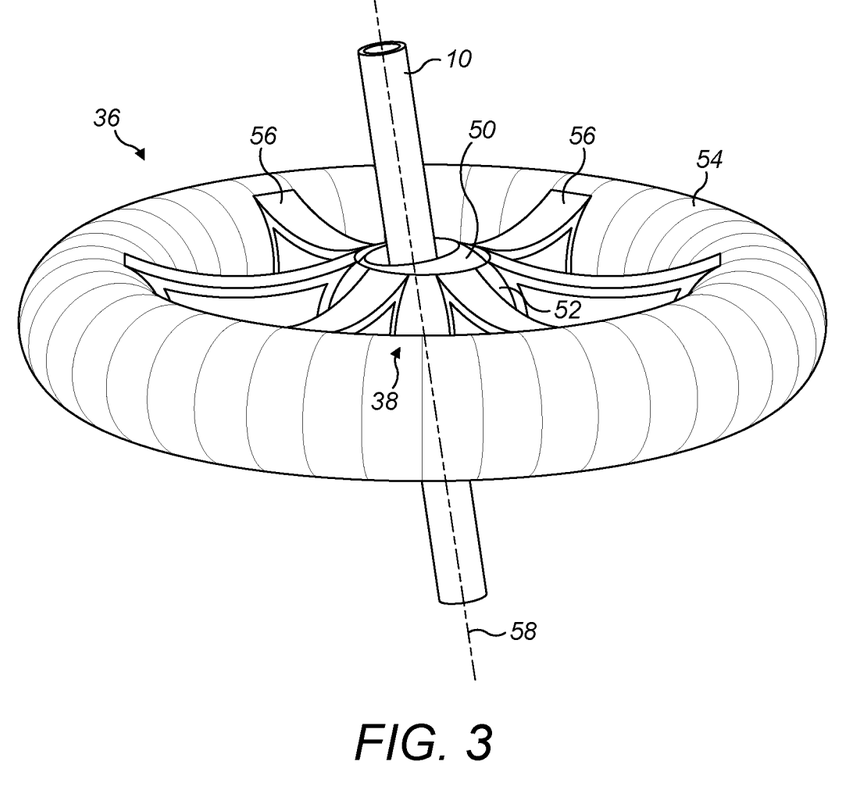
FIG. 3 is a detail perspective view of a buoy shown attached to the riser in FIGS. 1 and 2.
Figure 4:
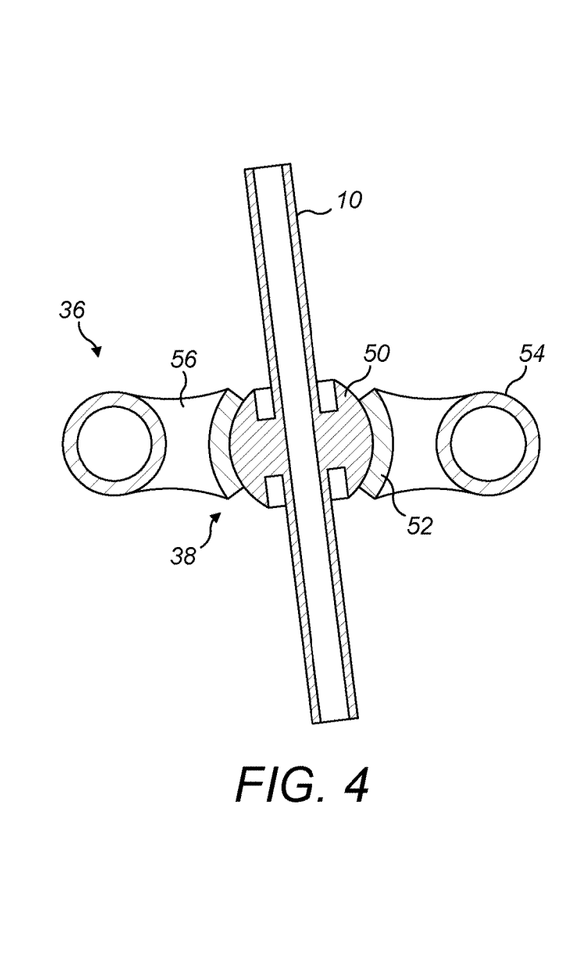
FIG. 4 is a sectional view of the buoy shown in FIG. 3.
Figure 5:
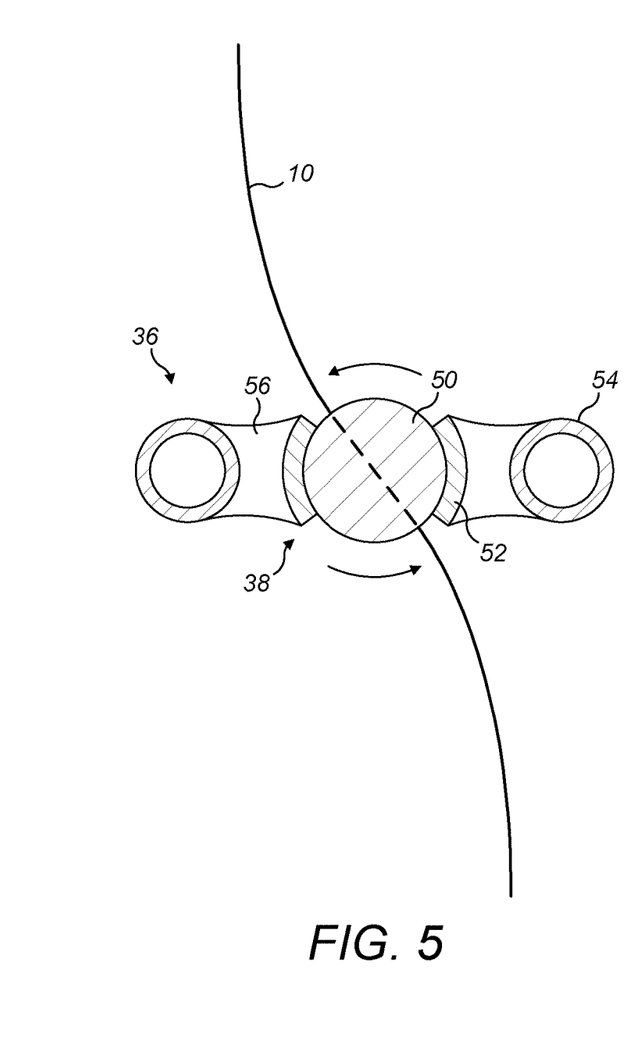
FIG. 5 corresponds to FIG. 4 but shows a ball joint of the buoy pivoting in response to deflection of the riser.

FIGS. 3 to 5 show further details of the buoy 36. Here, it will be apparent that the joint 38 comprises an outwardly convex, part-spherical inner ball 50 retained within a complementary inwardly concave annular hub 52 that defines a socket for the inner ball 50. In this example, the buoy 36 further comprises a buoyant toroidal body 54 of circular plan shape that lies in a substantially horizontal plane. The body 54 is supported by spokes or struts 56 that extend radially from the annular hub 52 with equiangular spacing. The struts 56 hold the body 54 spaced radially apart from the hub 52.

At least the body 54 of the buoy 36 may have its internal and external pressure equalised during the deployment of the riser 10, using pressurised air, packed macrospheres, syntactic foam or other known pressure-compensation techniques.

The toroidal shape of the body 54 exemplifies how, beneficially, buoyancy and mass may be offset radially from the central longitudinal neutral axis 58 of the riser 10 and may be distributed circumferentially around that axis 58. The offset and distributed buoyancy and mass offset the buoyancy forces exerted by the buoy 36 on the riser 10 and increase drag and the moment of inertia, which stabilise the buoy 36 and the riser 10.

The local inclination of the inflection portion of the riser 10 extending through the buoy 36 increases relative to the vertical as the S-curve becomes more pronounced with continued downward motion of the FPSO 14. As FIG. 5 shows schematically, changes in the inclination of this portion of the riser 10 are accommodated by rotation of the inner ball 50 within and relative to the annular hub 52 of the joint 38.

Figure 6:
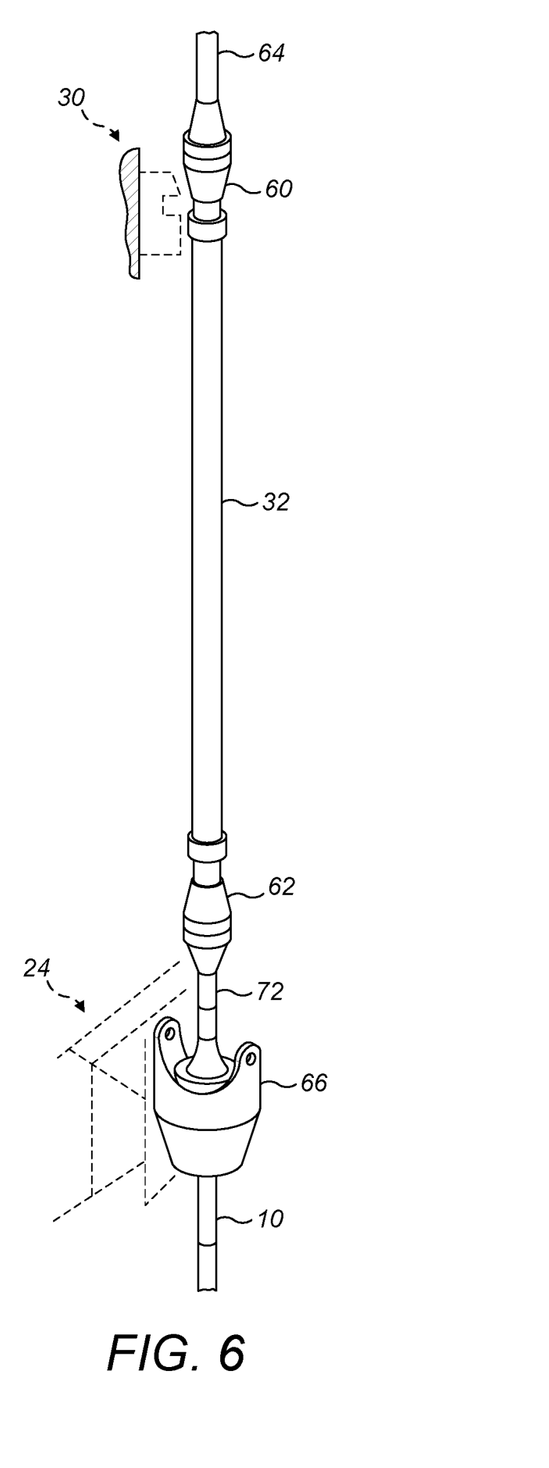
FIG. 6 is a detail perspective view of an upper clamp and a hang-off structure of the riser shown in FIGS. 1 and 2.
Figure 7:
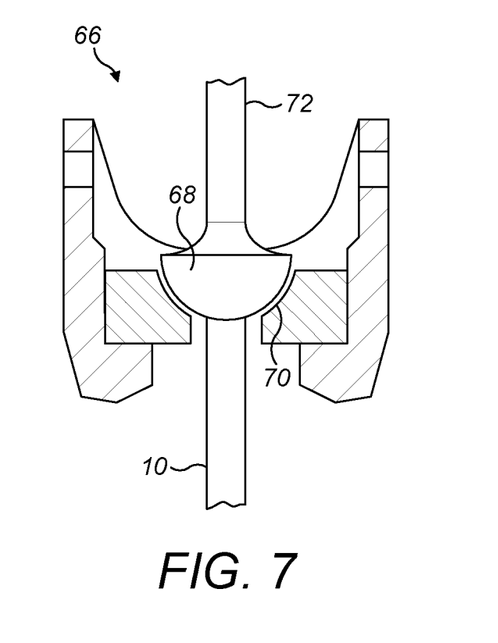
FIG. 7 is an enlarged sectional view of the hang-off structure shown in FIG. 6.

Finally, FIGS. 6 and 7 show further details of the pliant spool pipe 32 and its connections to the riser 10, the hang-off structure 24 and the upper clamp 30.

The pliant spool pipe 32 comprises upper and lower end fittings 60, 62 respectively. The upper clamp 30 engages the upper end fitting 60 to transfer the bending moment from the spool pipe 32 to the FPSO 14. A pipe section 64 surmounts the upper end fitting 60 to connect the riser 10 to pipework aboard the FPSO 14.

The top of the riser 10 comprises a downwardly tapering pull head 66 that is received in a socket of the hang-off structure 24 in a conventional manner. The pull head 66 houses the joint 26, which comprises a downwardly facing part-spherical ball formation 68 surrounding the riser 10, received by a complementary upwardly facing part-spherical seat 70. This is akin to the conventional hang-off arrangement used for flexible joints.

The ball formation 68 is surmounted by a tubular pup piece 72 that is in fluid communication with the riser 10 and with the lower end fitting 62 of the pliant spool pipe 32. The lower end fitting 62 is attached to the pup piece 72 by welding or by a flanged connector.

Many variations are possible within the inventive concept. For example, it would be possible for the buoy 36 to be held at a fixed longitudinal position relative to the riser 10. It would also be possible for the buoy 36 to be coupled to the riser 10 by a spring or damper system that resists, but does not prevent, relative longitudinal movement between the buoy 36 and the riser 10.

Apart from TCP, the pliant spool pipe 32 could be made of bonded or unbonded flexible pipe, of a rigid pipe with deformable sections, or of coiled tubing.

The toroidal body 54 could be elliptical or could have other looped shapes such as polygonal shapes. Also, it is not essential that the body 54 is continuous around the neutral axis 58 of the riser 10. Buoyancy and mass could instead be distributed discontinuously or interruptedly around the neutral axis 58.

The invention claimed is:

1. A subsea riser system comprises a rigid riser pipe that is suspended from a surface support as a catenary extending from the surface support through a sagbend to a seabed touch down point, wherein:
   an upper end of the riser pipe is attached to the surface support by a hang off interface that allows rotation of the riser pipe relative to the surface support about at least two horizontal axes;
   at least one subsea buoy is positioned on the riser pipe between the sagbend and the upper end of the riser pipe, the buoy being attached to the riser pipe by an attachment interface that allows rotation of the riser pipe relative to the buoy about at least two horizontal axes, wherein buoyant upthrust force is applied from the buoy to the riser pipe via the attachment interface; and
   the buoy comprises a buoyant body that is spaced radially from the riser pipe, wherein the attachment interface comprises a part spherical inner ball formation fixed relative to the riser, the ball formation being engaged with a complementary socket formation fixed relative to the buoyant body.

2. The riser system of claim 1, wherein the attachment interface also allows rotation of the riser pipe relative to the buoy about a central longitudinal axis of the riser pipe.

3. The riser system of claim 1, wherein the buoy is attached only to the riser pipe.

4. The riser system of claim 1, wherein the buoy is slidable along the riser pipe.

5. The riser system of claim 4, wherein sliding movement of the buoy relative to the riser pipe is limited by stopper formations that are spaced longitudinally along the riser pipe.

6. The riser system of claim 1, wherein the buoy is positioned at least 100 m above the seabed.

7. The riser system of claim 1, wherein the buoy is positioned at a depth of between one third and two thirds of local overall water depth between the surface and the seabed.

8. The riser system of claim 1, wherein the buoy is positioned closer to the seabed than to the surface.

9. The riser system of claim 1, wherein the riser pipe is made of steel or of a thermoplastic composite material.

10. The riser system of claim 1, wherein the buoyant body is distributed angularly around the riser pipe.

11. The riser system of claim 10, wherein the buoyant body extends continuously around the riser pipe.

12. The riser system of claim 11, wherein the buoyant body is toroidal.

13. The riser system of claim 1, further comprising a pliant spool pipe extending between the hang off interface and an upper connection structure of the surface support, the spool pipe being in fluid communication with an upper end of the riser pipe via the hang off interface.

14. The riser system of claim 13, wherein a lower end portion of the spool pipe is aligned on a common longitudinal axis with an upper end portion of the riser pipe.

15. A buoy for a subsea riser, the buoy comprising an inner part for attachment to a riser pipe, an outer part that is movable relative to the inner part, and a buoyant body for applying buoyant upthrust force to the riser pipe, wherein:
   the buoyant body is spaced radially from the inner part;
   the inner part comprises a part-spherical inner ball formation and defines a longitudinal axis; and
   the outer part comprises a complementary socket formation engaged with the ball formation, and is pivotable about pivot axes that are orthogonal to each other and that intersect the longitudinal axis.

16. The buoy of claim 15, wherein the outer part is also pivotable about the longitudinal axis.

17. The buoy of claim 16, comprising a buoyant body that is spaced radially from the inner part.

18. The buoy of claim 17, wherein the buoyant body is distributed angularly around the inner part.

19. The buoy of claim 18, wherein the buoyant body extends continuously around the inner part.

20. The buoy of claim 19, wherein the buoyant body is toroidal.

21. A method of supporting a rigid subsea riser pipe that is suspended from a surface support as a catenary extending from the surface support through a sagbend to a seabed touch-down point, the method comprising:
   applying buoyant upthrust force to the riser pipe from a subsea buoy that surrounds the riser pipe and is positioned between an upper end of the riser pipe and the sagbend; and
   in response to movement of the surface support, deflecting the riser pipe to vary inclination, relative to the buoy, of a portion of the riser pipe extending through the buoy;
   wherein the buoyant upthrust force is applied to the riser pipe via an attachment interface that attaches the buoy to the riser pipe and that allows rotation of the riser pipe relative to the buoy about at least two horizontal axes, and wherein the attachment interface comprises a part spherical inner ball formation fixed relative to the riser, the ball formation being engaged with a complementary socket formation fixed relative to the buoyant body.

22. The method of claim 21, wherein said deflection of the riser pipe imparts or varies S-shaped curvature in the riser pipe along its length, that curvature comprising mutually opposed curves respectively above and below the buoy, joined by a region of inflection.

23. The method of claim 21, comprising constraining an upper end of the riser pipe while allowing the upper end to pivot relative to the surface support in response to said deflection of the riser pipe.

24. The method of claim 21, comprising also deflecting a pliant spool pipe extending upwardly from the upper end of the riser pipe, in response to said deflection of the riser pipe.

25. The method of claim 21, comprising allowing limited longitudinal movement of the riser pipe relative to the buoy.

* * * * *